United States Patent
Webb et al.

(10) Patent No.: US 8,052,521 B2
(45) Date of Patent: Nov. 8, 2011

(54) USING CURRENCY IN ONLINE FANTASY SPORTS GAMES

(75) Inventors: Brian A. Webb, Sunnyvale, CA (US); Miles A. Libbey, IV, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 758 days.

(21) Appl. No.: 12/163,754

(22) Filed: Jun. 27, 2008

(65) Prior Publication Data

US 2009/0325685 A1 Dec. 31, 2009

(51) Int. Cl.
*A63F 13/12* (2006.01)

(52) U.S. Cl. ...... 463/25; 463/23; 273/317.3; 273/317.4; 273/317.5; 273/317.6; 377/5; 700/90; 700/91; 705/37

(58) Field of Classification Search .................. 463/1–9, 463/20, 23, 25, 30–32, 34, 36–37, 40–43, 463/46–47, 50, 53, 56; 273/108.1, 108.3, 273/108.4, 118 R, 150, 244, 244.1, 247, 259, 273/317.1, 317.3, 317.4, 317.5, 317.6, 359, 273/406, 440.1, 460–461; 340/323 R, 323 B; 345/473–475, 618–619, 629; 377/4–5; 700/90–93; 705/37; 709/203–207; 725/37, 40, 58, 112, 725/114, 135–136, 138, 141, 144; *A63F 13/12*
See application file for complete search history.

(56) References Cited

U.S. PATENT DOCUMENTS

| | | | |
|---|---|---|---|
| 5,636,920 A | 6/1997 | Shur et al. | |
| 5,713,793 A * | 2/1998 | Holte | ............................... 463/25 |
| 5,971,854 A | 10/1999 | Pearson et al. | |
| 6,041,266 A | 3/2000 | Nickerson | |
| 6,193,610 B1 | 2/2001 | Junkin | |
| 6,371,855 B1 * | 4/2002 | Gavriloff | ........................ 463/42 |
| 6,656,042 B2 | 12/2003 | Reiss et al. | |
| D491,956 S | 6/2004 | Ombao et al. | |
| D499,740 S | 12/2004 | Ombao et al. | |
| D510,362 S | 10/2005 | Minagawa et al. | |
| D538,295 S | 3/2007 | Noviello et al. | |
| D538,815 S | 3/2007 | Noviello et al. | |
| D538,816 S | 3/2007 | Noviello et al. | |

(Continued)

OTHER PUBLICATIONS

Anonymous. (2000). Y! Sports Screen Shot of Fantasy Baseball Home Page, 1 page.

(Continued)

*Primary Examiner* — Arthur O. Hall
(74) *Attorney, Agent, or Firm* — James J. DeCarlo; Greenberg Traurig, LLP

(57) ABSTRACT

Techniques are provide for linking actions in an online fantasy sports game to a currency balance associated with a user of the game. The techniques adjust the balance by a first quantity in response to a sports player action, where the first quantity is based upon the player action, and adjust the balance by a second quantity in response to transfer of a sports player to or from a fantasy sports team associated with the user, where the second quantity is based upon a value of the sports player; and, prevent transfer of the sports player to the fantasy sports team in response to the second quantity being greater than the balance. The currency balance may be increased by the first quantity in response to the sports player action. The sports player action may include scoring a number of game points, and the first quantity may be based upon the number of game points.

36 Claims, 4 Drawing Sheets

U.S. PATENT DOCUMENTS

| | | | |
|---|---|---|---|
| D538,817 S | 3/2007 | Noviello et al. | |
| D538,818 S | 3/2007 | Noviello et al. | |
| D549,717 S | 8/2007 | Noviello et al. | |
| D550,233 S | 9/2007 | Vigesaa | |
| D550,241 S | 9/2007 | Viegers et al. | |
| D551,675 S | 9/2007 | Noviello et al. | |
| D554,653 S | 11/2007 | Noviello et al. | |
| D557,702 S | 12/2007 | Viegers et al. | |
| D558,213 S | 12/2007 | Noviello et al. | |
| D559,259 S | 1/2008 | Noviello et al. | |
| D559,260 S | 1/2008 | Noviello et al. | |
| D569,869 S | 5/2008 | Chotai et al. | |
| D571,373 S | 6/2008 | Loehr et al. | |
| D572,717 S | 7/2008 | Loehr et al. | |
| D579,943 S | 11/2008 | Clark et al. | |
| D594,012 S | 6/2009 | Ng et al. | |
| D594,464 S | 6/2009 | Ng et al. | |
| 7,699,707 B2 * | 4/2010 | Bahou | 463/42 |
| 7,896,740 B2 * | 3/2011 | Asher et al. | 463/26 |
| 2002/0040253 A1 | 4/2002 | McNally et al. | |
| 2002/0107073 A1 * | 8/2002 | Binney | 463/42 |
| 2004/0266530 A1 * | 12/2004 | Bishop | 463/42 |
| 2004/0266535 A1 * | 12/2004 | Reeves | 463/42 |
| 2005/0064937 A1 * | 3/2005 | Ballman | 463/40 |
| 2005/0159220 A1 * | 7/2005 | Wilson et al. | 463/40 |
| 2005/0228780 A1 | 10/2005 | Diab et al. | |
| 2006/0183548 A1 | 8/2006 | Morris et al. | |
| 2006/0217198 A1 | 9/2006 | Johnson | |
| 2007/0021165 A1 | 1/2007 | Ma et al. | |
| 2007/0072679 A1 * | 3/2007 | Kerns et al. | 463/42 |
| 2007/0185599 A1 | 8/2007 | Robinson et al. | |
| 2007/0233585 A1 * | 10/2007 | Ben Simon et al. | 705/35 |
| 2007/0243917 A1 | 10/2007 | Wojewoda et al. | |
| 2007/0243918 A1 | 10/2007 | Wojewoda et al. | |
| 2008/0026804 A1 | 1/2008 | Baray et al. | |
| 2008/0033840 A1 | 2/2008 | Upendran et al. | |
| 2008/0051201 A1 * | 2/2008 | Lore | 463/42 |
| 2008/0096664 A1 | 4/2008 | Baray et al. | |
| 2008/0102911 A1 | 5/2008 | Campbell et al. | |
| 2008/0103894 A1 * | 5/2008 | Liang et al. | 705/14 |
| 2008/0147575 A1 | 6/2008 | Roy | |
| 2008/0153589 A1 | 6/2008 | Baray et al. | |
| 2008/0155436 A1 | 6/2008 | Hirano et al. | |
| 2008/0274782 A1 * | 11/2008 | Schmidt | 463/13 |
| 2008/0280685 A1 * | 11/2008 | Hansen et al. | 463/42 |
| 2008/0287198 A1 * | 11/2008 | Callery et al. | 463/42 |
| 2009/0156312 A1 * | 6/2009 | Ng et al. | 463/42 |
| 2010/0285857 A1 * | 11/2010 | Anderson et al. | 463/9 |

OTHER PUBLICATIONS

Anonymous. (Sep. 29, 2004). Y! Sports (ID#101) GMC Fantasy Baseball Plus Screen Shot, 1 page.

Non-Final Office Action mailed on Dec. 12, 2007, for U.S. Appl. No. 11/406,663, 7 pages.

* cited by examiner

USING CURRENCY IN ONLINE FANTASY SPORTS GAMES

BACKGROUND

1. Field

The present application relates generally to online games, and more particularly to fantasy sports games.

2. Related Art

Online fantasy sports games are known in the art. These games may be played by users who interact with the game via user interfaces that allow the users to select real-life players to associate with the user, i.e., to be members of the user's fantasy sports team. Users may bid on players in an initial bidding phase, which closes before the start of game play. Users may also trade or transfer players to and from other users. Users accumulate points as the players on their team(s) score points in the game. Actions of the players in the real life games such as scoring points or becoming injured are used as a basis for corresponding actions in the fantasy sports game.

In one example, the objective of a fantasy sports game is to select and acquire a group, e.g., team, of one or more players that correspond to real-life players, with the goal of maximizing the number of game points scored by the corresponding real-life players in real-life games over some period of time, e.g., a sports season. Multiple users participate in the game, and each user is associated with one or more players that form a team. The user's players correspond to real-life players, but the user's team, i.e., set of players, is defined by the user's choice of players, which may be selected from different real-life teams. Therefore, the user's team need not correspond to a real-life sports team.

At the beginning of the game, during an acquisition phase, users select players for teams. Users may be restricted to acquiring a particular number of players, e.g., the number of players on a team for the particular sport plus some additional backup players. The players available for acquisition may be divided into classes, and users may be further restricted to acquiring a particular number of player from each class. For example, the star players who are known to consistently perform well may be in one class, and players who perform at an average level or are regarded as less desirable may be in a second class. The user may be allowed to select two players from the first class, three players from the second class, and so on for other classes.

Once a user has selected a player to be added to the user's team, the user submits a request to acquire the player. A user is said to "own" a player if the player has been allocated to that user, i.e., has become a member of that user's team, or, in other words, is "on" that user's team.

The winning user is the user whose team has the largest sum of game points at the end of the time period or sports season. The sum of game points for each user is calculated by adding up the point scored in real life by the players on the user's team. Users may be, for example, humans interacting with the game via computer program code such as a web browser executing on a client computer, which communicates with server computers that provide the game features.

SUMMARY

A fantasy sports game is played by users, e.g., humans, who interact with the game via a device such as a client computer executing computer program code that provides a user interface for communicating with a server computer via a communications network, where the server computer executes computer program code that provides or implements the fantasy sports game. Each user plays the fantasy sports game by choosing players for a fantasy sports team. The players represent corresponding real-life players, and a score is generated for the user's team based upon the performance of the corresponding real-life players in real-life sports games. The score is generated after each real-life game. Users may modify their fantasy sports teams by, for example, replacing the player(s) assigned to a team with different players or making other changes to the team's configuration.

In general, in a first aspect, the invention features a currency-based fantasy sports game. Each user is supplied with an initial balance, i.e., quantity, of zero or more currency units, such as points, dollars, or other units. The currency units may be units of a real-life currency, e.g., dollars, or any other units that may be used as currency, e.g., game points, credits, tokens, and the like. The user spends a portion of the initial balance of currency units on assembling a team of one or more players. The currency units may be spent on, for example, acquiring players to add to the team or to replace existing players on the team. The initial balance of currency may be provided as a credit, which the user is expected to repay over time.

The user's balance changes as a result of player actions, such as actions that contribute to winning a game, including scoring points or achieving goals according to the game rules, preventing an opposing team from scoring points, and other actions that advance the position of the user against an opponent. The quantity by which the balance changes is based on the action. For example, when a player on a user's team scores points, the currency balance may increase by an amount based upon the number of points scored by the player. The currency balance therefore increases as the user's team of players performs well, and generally decreases when the user acquires a new player.

Players may be sold to or bought from other users, in which case the players are transferred between the users involved in the transaction, or to and from other entities, as occurs during the initial draft at the beginning of a fantasy sports game. The transfers of players occur in various types of transactions that users may perform during certain times in the fantasy sports game. For example, player transfers may be allowed in the time periods between real-life games, but not during real-life games. The types of transactions that may be performed include drafting a player, which typically occurs at the beginning of the game, trading or transferring a player to another user in exchange for another player and/or currency, and acquiring an unclaimed player (e.g., a free agent).

The user's balance changes in response to transfer of a player to or from the user's fantasy sports team. The quantity by which the balance changes is based upon a value of the player. The value, i.e., cost of the player may be determined by an auction, by an agreement between the users involved in the transaction, by a depreciation-based formula, or by any other process that can be implemented in the fantasy sports game. As part of the transaction, the player(s) becomes a member of the other user's team, and the cost of the player is deducted from the balance of the user receiving the player and added to the balance of the user from whom the player is received. For example, a user may acquire a player in exchange for currency, i.e., buy a player, in which case the cost of the player is deducted from the user's balance. Similarly, a user may receive currency in exchange for a player, i.e., sell a player, in which case the cost of the player is added to the user's balance.

In real life sports, the primary goal of a team owner is often to generate as much money as possible. The use of a currency balance therefore allows for a more realistic simulation of real-world sports teams, because the user can take actions, such as buying or selling players, that have costs or benefits determined in a market-like environment, and the actions result in income amounts based on the real-world performance of the players. The currency balance of each user at a particular time, such as the end of the season, may be used to rank that user's performance in the fantasy sports game, and the user with the highest currency balance may be selected as the winner of the game.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1:
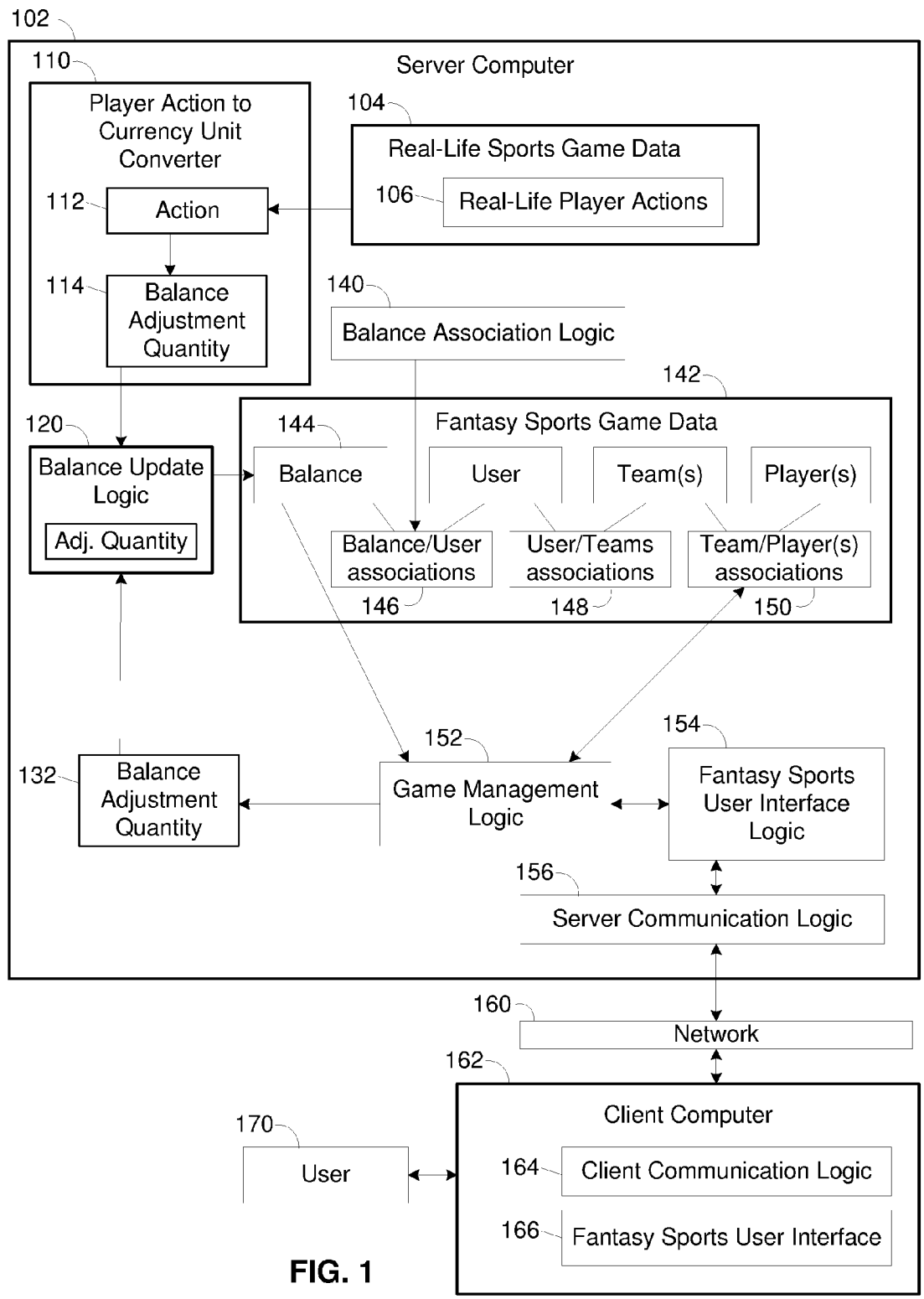
FIG. 1 is an illustrative drawing of an online fantasy sports game in accordance with embodiments of the invention.

FIG. 1 is an illustrative drawing of an online fantasy sports game in accordance with embodiments of the invention. In one aspect, a server computer 102 provides a fantasy sports game to be played by one or more users 170. The fantasy sports game may be, for example, any online sports game that is based upon real-life results of sports games. The sports game may be based on, for example, football, baseball, golf, soccer, automobile racing, or the like. In one aspect, the fantasy sports game may be provided by server-based computer program code that executes on the server computer 102. Fantasy sport user interface logic 154 may include, for example, server-based code such as a web server, e.g., Apache® or the like, which provides web-based interface, e.g., HTML, Adobe® Flash®, JavaScript™, AJAX, or the like to one or more client computers 162 via a network 160, e.g., the Internet. The fantasy sports user interface 166 is thus generated by, e.g., a server page, or, e.g., downloaded code provided by the fantasy sports user interface logic 154.

The fantasy sports user interface 166 is, in one aspect, a web-based interface that may include web pages or other user interface features, e.g., sports game information, results, and user interface controls, that are displayed to the user 170 on a display of the client computer 162, and that receive input from the user 170, e.g., selection of menu items or controls that a user selects or interacts with while playing the sports game. The fantasy sports user interface 166 provides the interface features through which the user 170 plays the fantasy sports game. The user interface 166 may include screens or other types of user interfaces for presenting information to the user 170 and receiving choices made by the user 170. There may be interfaces for joining or creating a fantasy sports league, creating a team, assigning players to the team, removing players from the team, and configuring the positions of players on the team. The user's selections in these interfaces are transmitted from the client computer 162 to the server computer 102 via the network 160. In one aspect, fantasy sports user interface logic 154 on the server 102 generates a fantasy sports user interface 166, e.g., a web page or a web application, that is transferred from the server 102 to the client 162 via the network 160.

In one example, server communication logic 156 provides an interface between the fantasy sports user interface logic 154 on the server 102 and the network 160, e.g., by converting code and data sent to and received from the client computer 162 to a format suitable for transmission on the network 160. Client communication logic 164 provides an interface between the fantasy sports user interface 166 and the network 160 by, for example, receiving and decoding user interface logic 154 and associated data, as well as encoding responses from the user 170 and sending the responses to the server 102 via the network 160, to be decoded by the server communication logic 156 and presented to the fantasy sports user interface logic 154, and in turn to game management logic 152 and further processing on the server 102 as follows.

In one example, the fantasy sports game is implemented by components such as computer program code, logic, or the like, located on the server computer 102. The game components include fantasy sports game data 142, which may be, for example, a data structure stored in a random access memory of the server 102, or stored in a persistent database (not shown), or in a combination of random access memory and persistent storage. The game data 142 includes a currency balance 144, a user identifier, a team identifier, and a player identifier. (Note that the term "a" as used herein may refer to one or more of the named objects.) The currency balance 144 represents a quantity of money, points, credits, or the like, associated with a user by balance-user associations 146. In one example, the currency balance 144 is a numeric value, e.g., 0 to represent no value, a positive number to represent some positive quantity of currency, e.g., $10, or a negative value to represent a debt, e.g., −$10. The balance-user associations 146 may be, for example, pairs of the form (balance, user identifier), where balance is a currency balance value and user identifier is a number or short string. The balance-user associations may be established by, for example, balance association logic 140, which may provide an initial balance for each user, where the initial balance is a parameter of the fantasy sports game that may be set when the game is configured, e.g., before game play begins for a particular season.

Each user in the fantasy sports game data 142 is associated with one or more teams by user-team associations 148. The user is said to be the "owner" of the associated team. A user-team association 148 may be represented as, for example, a pair (user identifier, team identifier), where team identifier is a number or string that refers to a fantasy sports team. Each fantasy sports team may be associated with one or more players, who are said to be "on" the team. The user associated with the team is also said to "own" the players. The team-player association 150 may be represented as, for example, pairs of the form (team identifier, player identifier), where player identifier is a number or string that refers to a fantasy sports player or, in another example, directly to a real-life sports player. A fantasy sports player ordinarily corresponds to a real-life player, e.g., by having the same name as the real-life player. For example, a fantasy sports player with the name "Rod Carew" or the player identifier 15534 may refer to the real-life player Rod Carew. The difference between fantasy sports players and real-life players is generally not significant for the discussion herein, in which the term "player" may be understood to refer to a fantasy sports player or real-life player, and the term fantasy sports player ordinarily refers to an entity in a fantasy sports game that represents a real-life player, but may also refer to an entity that represents a fictional player.

The currency balance 144 may increase or decrease in response to events in the fantasy sports game, such as player trades and player acquisitions, or in response to events in the real-world, such as game actions, e.g., scoring points, winning a game, or the like. Balance update logic 120 receives a balance adjustment quantity and adds the quantity to the balance 144. The quantity may be positive to increase the balance 144 or negative to decrease the balance 144. Events in the fantasy sports game ordinarily involve (e.g., cause) changes to the fantasy sports game data 142, which is modified by and monitored by game management logic 152, which receives instructions from the fantasy sports user interface logic 154. For example, a first user may select a user interface option for trading a player to another team owned by a second user. The user interface logic 154 receives the trade instruction and forwards it to the game management logic 152, which modifies the team-player associations 150 to remove the association between the first user's team and the player, and creates an association between the second user's team and the player. If a currency amount is involved in the transaction, e.g., as a payment by the second user for the player, then the game management logic 152 also subtracts a balance adjustment quantity 132 (that corresponds to the currency amount) from the second user's balance 144 and adds the balance adjustment quantity 132 to the first user's balance 144. The game management logic 152 updates the balance 144 via the balance update logic 120 by a balance adjustment quantity 132 based on events or transactions, e.g., player acquisitions or trades, that occur in the fantasy sports game.

The balance 144 may also be adjusted in response to events that occur in the real world, such as real-life player actions 106 that are received by the fantasy sports game as part of real-life sports game data 104. The real-life player actions 106 may be, for example, descriptions of sports players' actions such as scoring points, preventing an opponent from scoring points, and the like. The descriptions may be represented in a machine-readable form, e.g., as a data set that includes an action name or identifier that identifies the type of action, e.g., scoring a home run in baseball, scoring a touchdown in football, or scoring a goal in soccer. A player action to currency unit converter 110 receives these action descriptions as actions 112, and generates a currency amount based upon each action 112. The converter 110 may generate the currency amount based upon a table that maps actions to currency amounts, or based upon a formula or other logic. For example, a home run may be translated to a currency amount equal to the number of points that were scored as a result of the home run, a touchdown may be translated to 6 currency units corresponding to the 6 points awarded to the team for a touchdown in football, and a soccer goal may be translated to 1 point, corresponding the single point awarded for a goal in soccer. The player action to currency unit converter 110 than supplies the currency amount to the balance update logic 120 as a balance adjustment quantity, so that, for example, the balance 144 associated with a user increases by 6 currency units in response to a player associated with a team associated with the user scoring a touchdown.

In one example, the objective in a fantasy sports game is to select and acquire a team of one or more players that correspond to real-life players and that will maximize a balance of currency units, where the balance is based upon actions, e.g., scoring points, performed by the corresponding real-life players in real-life games over some period of time, e.g., a sports season. The currency units may be, for example, a number that expresses a quantity of units, such as points, dollars, or other units. The currency units may be units of a real-life currency, e.g., dollars, or any other units that may be used as currency, e.g., points, credits, tokens, and the like.

The currency units may be understood as a virtual currency, i.e., a currency that does not have real-world value, but is provided to users as part of the game and accepted by the game from users in exchange for game entities such as players, and provided by the game (or, in another view, by other players) to the user in exchange for game entities such as players.

Users may be, for example, humans that interact with the game via computer program code such as a web browser executing on a client computer, which communicates with server computers that provide the game features. The fantasy sports game may be provided by logic or computer program code modules, referred to herein as game logic, executing on a combination of client computer(s) and server computer(s). In one example, the game logic implements the game using data structures e.g., a database of fantasy sports users, teams, players, real-life game actions, associated data and statistics, and processes, e.g., processes for awarding currency units to users based upon player actions in real-life games, processes for associating players with teams to represent the acquisition of players by teams, processes for interacting with the user(s) via a user interface, and the like. The game logic may be located on the server computer(s).

In one example, multiple users participate in the game, and the winning user is the user whose team has the largest balance of currency units at the end of the time period or sports season. Users begin the game with an initial balance of currency units, and users attempt to earn more currency units during the game by performing game actions that result in awards of currency units to the users. The currency units awarded to players are, in one example, generated by the game logic, and there is no explicit limit imposed on the number of currency units that may be generated and awarded to players. Currency units generated by the game logic and provided to a user are said to be provided by "the game." Similarly, currency units paid by a user from the user's balance may be paid "to the game," i.e., given up to no other user. Currency units may also be paid by the user to other users, e.g., as part of an exchange of one player for another player that the users do not believe is equal in value to the first player.

In one example, users may acquire players during an initial acquisition stage that occurs at or near the beginning of the game, during subsequent transfer windows, or in free agency, during which a player may be added at any time. A user may submit a request to the game logic to acquire a player, i.e., add the player to the user's team. If certain conditions are met, e.g., that the user's balance of currency units is greater than or equal to the price of the player, as described below, the request to acquire the player is granted, and the player becomes a member of the user's team; otherwise, the request is denied and the player does not become a member of the team in response to that request. A user is said to "own" a player if the player has been allocated to that user, i.e., has become a member of that user's team, or, in other words, is "on" that user's team.

In one example, users may spend more currency units than they have accumulated, resulting in a negative balance that represents a debt to be repaid. There may be a limit on the debt, e.g., a lower limit of −200, representing a credit limit of 200 currency units. This debt feature allows users to mimic strategies employed by some real-life teams, i.e., hire the best players with the expectation that those players will statistically dominate and overcome the high initial price, as is done by soccer teams such as Liverpool, Manchester United, and Chelsea in the real-life English Premier League. Alternatively, some users may choose to take a more value conscious approach, e.g., using relatively few of the initially allocated currency units to attempt to hold the early lead, as is done by other real-life teams, such as Newcastle.

Multiple leagues may be used in fantasy sports games to divide the users into smaller groups, so that each player can be allocated to at most one team. In games that use leagues, players are uniquely allocated to a user and league combination, so that at most one user in a given league may own a particular player. In other variations, players are not divided into leagues, and more than one player may own a particular player.

In one example, after registration, a draft occurs to allocate players to each user's team. Various types of drafts may be used for player allocation, such as autodraft, offline, or an auction-style draft. Each user may choose a formation, and thus will have flexibility in roster composition. Users use their currency balance to bid on players in real time bids, or use a sealed bid structure for non-real time bids.

During a game season, a user may change his or her team's formation to attempt to create the team's optimal lineup. Each team may have up to a predetermined number of players (e.g., 11) that may earn currency units. Players on a team may be either starting or non-starting. Starting players are active, i.e., play in the game, and therefore may earn currency units for the user. Non-starting players are inactive, i.e., do not play in the game, and do not earn currency units for the user. A user may modify the team's lineup by changing the status of one or more players from starting to non-starting or vice versa. Users may drop and add players not assigned to another user's team during any transfer window in the fantasy sports game by winning a sealed-bid player auction. Such changes may be applied in future games. In one example, dropping or cutting a player does not return currency units to the user. To deter abuse, players that are dropped may be made unavailable for re-adding by other players for a number of days, e.g., 2 days.

In one example, a time window for transfers opens some number of times during each game season, e.g., twice during each season. During the transfer window, a user may attempt to buy any player the user does not own by offering of a number of currency units. The price paid for the player may be referred to as the player's salary. After an offer has been made for a player, the player has a new salary, and the team that owns the player pays that salary. The game ends once the real-life season is completed, e.g., once the English Premier League season (for soccer) or Major League Baseball season (for baseball) ends.

In one aspect, in subsequent years of game play, commissioners (e.g., users that create and/or manage leagues) may configure their leagues with the same settings as in the previous year, invite the previous years' players or users to join the league, assign initial point values, and set the number of players that may be retained, i.e., "kept", from the previous season. In one example, a user may designate a player to keep from the previous year at the player's end of season salary, i.e., most recent cost. For example, if a user owned Rod Carew at a value of 10 points in the previous season, the user may decide to keep Carew at 10 points, instead of attempting to win Carew in the initial auction, though another user may attempt to change Carew's price during the initial transfer window.

As introduced above, in one example, each player has an associated value, i.e., salary, measured in currency units. A player's value is based upon a prediction of the value that the player will add during the remaining time of the fantasy sports game. Value is created by real-life players' actions in real-life games. These real actions are transformed into currency units, such as points or dollars, which are added to the balance of the player's owner's team. In one example, users may increase their currency balances by starting a player that perform those real actions, or by selling a player to another user. Users may also transfer value to other users by purchasing players.

In one aspect, users lose value (to the game) by over valuing a player. Users gain value (from the game) when the sum of the points the player creates is greater than the sum of the purchasing points the player spends. In games that end at a particular date and do not allow players to be held over until the next season, the total player value, i.e., the sum of the values of all players in the league, declines over time with each game, because each player's potential future income diminishes in games. If a player is consistent and predictable, that player's value on the first day of the season is the player's maximum value, and the player's value depreciates linearly as the season progresses.

In one example, players that are used unexpectedly, i.e., new players or players that are placed in the game during the season, or for which new information becomes available, may see a temporary increase in value, but subsequently begin depreciating. For example, a new player or injury replacement should see a rise in predicted value over a few games as the information (about their role, ability, and the like) increases, but the predicted value will eventually decline.

Thus, the value of each player is expected to depreciate. The fantasy sports game therefore determines the player values, for purposes of, for example, setting starting auction prices or setting default prices for transferring players. Straight line depreciation may be calculated as the player's acquisition value divided by the number of remaining games at acquisition time. In real life, there is overhead to acquiring new players, e.g., relocation expenses; cultural integration; new plays, new team structures to learn; and the like. Transfers may therefore include an extra cost that represents the real-life friction involved in transferring a player between teams. In one example, the player's current owner may be permitted to pay an amount (e.g., 90% or 10 currency units, whichever is greater) less than a hostile bid to keep the player.

A minimum raise may be required to start a transfer process. For example, transfers may be restricted to bid amounts that are greater than a particular percentage of the current value, to limit trades to correcting relatively large market deficiencies. Similarly, if there is a current owner discount as above, any bid below the discount would not be successful. If a minimum raise is required, the minimum raise may be above the discount, e.g., the current owner bids 20% above the discounted value to retain the player.

In one example, a user's positive unspent currency balance gains interest that accrues to the user's currency balance, so that an existing balance have the potential to earn more currency units. In another example, a user's negative currency balance (i.e., debt) gains interest that adds to the negative currency balance and is to be repaid. In yet another example, in games that allow players to be kept after the end of the season, players may have a salvage value. The value of a player may depreciate over a time frame that is longer than the length of a single season, and may reflect the earning potential over that longer time frame. In another example, in games that do not allow players to be kept after the end of the season, players do not have a value (i.e., their value is zero) at the end of a season, because they have no earning potential.

In one aspect, in "keeper league" games that allow players to be kept across multiple seasons, at the end of a season, the transfer window does not open until players that may be kept through to the next season have been identified. The initial value of such "keeper" players in the next season may be, for example, the initial purchase price from the current season, or the most recent purchase price. The keeper players are not part of the default initial acquisition transfer window bidding, so that their price is not set to the market price.

As an example of a depreciation calculation, suppose that User A acquires a player named Joe during the initial acquisition for 70 currency units, and Joe's team is expected to play 38 games. Therefore, Joe's value depreciates at 70/38=1.8 units/game. After game 4, User B decides to attempt a transfer. Joe's book value is 70 (the initial price)−(1.8*4) (the depreciation)=62.6. A 20% minimum raise would require User B to start bidding at 75 currency units. Assuming that bidding progresses to 100, to keep Joe, User A needs to bid 90 (90% of 100). If User A does bid 90%, thereby keeping Joe, and Joe pays a round number (90−62.6)=27 units to the game, then Joe's value is set to his new value, 90, and Joe now depreciates at 90/34=2.6 units/game.

As another example, suppose that User A acquires Joe during initial acquisition for 70 currency units. Joe's team is expected to play 38 games, so his value depreciates at 70/38=1.8 units/game. After game 3, Joe is transferred to a new team in real life. Joe's pre-transfer value is 70−(3*(70/38))=64.5. His new team is expected to play 30 games. Joe's value remains the same, but his depreciation rate increases to 64.5/30=2.15.

Figure 2:
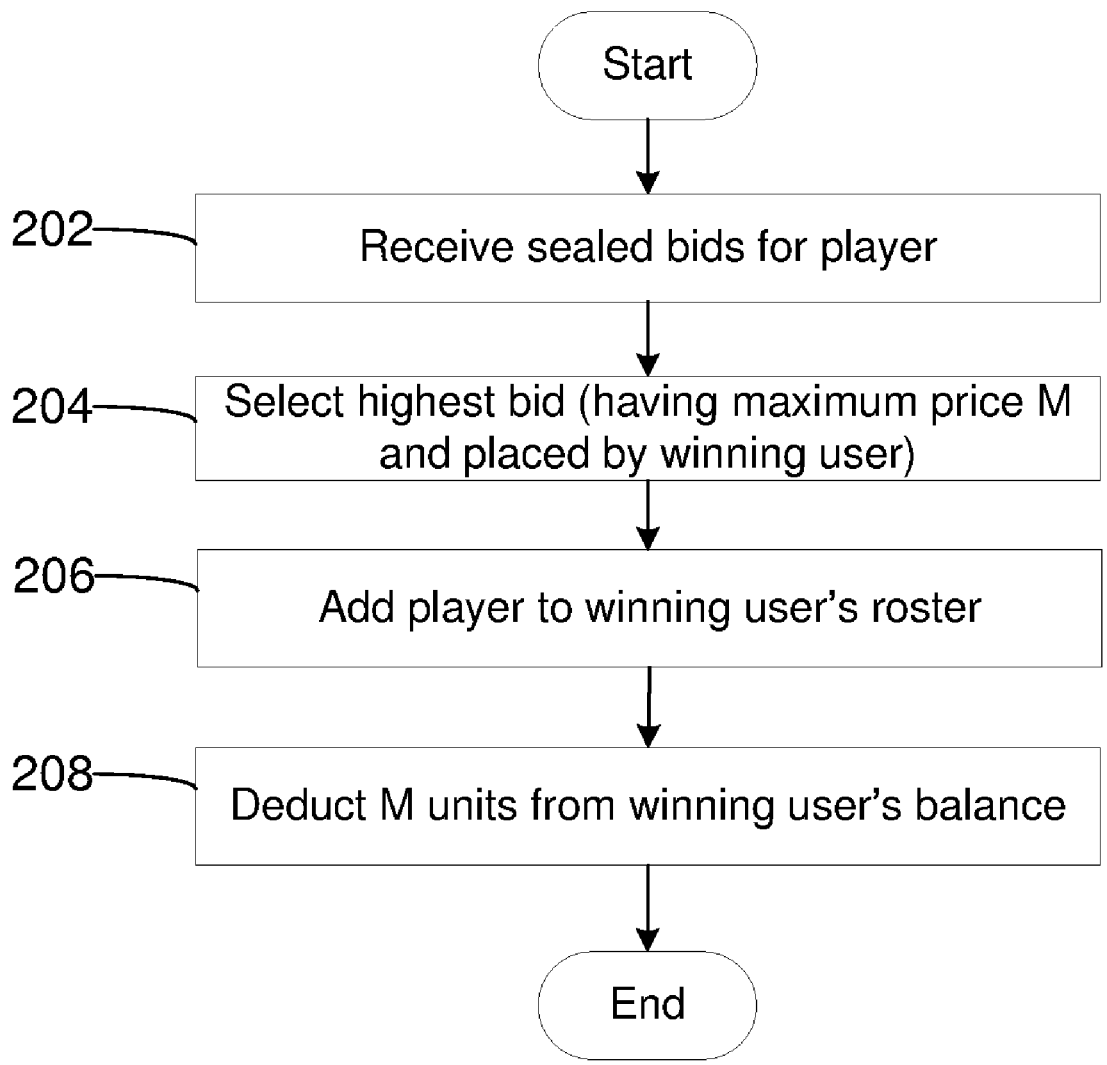
FIG. 2 illustrates a process of acquiring fantasy sports players in accordance with embodiments of the invention.

FIG. 2 illustrates a process of acquiring fantasy sports players in accordance with embodiments of the invention. In one example, players may be acquired as follows. Unclaimed players (e.g., 'free agents' in fantasy football/baseball) may be acquired at substantially any point in time during the sports game's season via a sealed auction bid. In the sealed auction, each user may submit a sealed bid for a player. Block 202 of the process receives the sealed bid(s) from the user(s) that submit bids. The fact that a user has submitted a bid for a particular player is public knowledge in the game, and is disseminated via user contact settings (e.g., email or SMS messages) and a pending transactions module (e.g., in fantasy football and baseball). In one example, a user's bids are evaluated at the next midnight after 24 hours in Universal Coordinated Time (UTC), or soon thereafter, as server time is available. For example, if the first bid occurs at 11:58 pm on Tuesday, the evaluation occurs at midnight on Wednesday (24:01 later). If the first bid occurs at 12:01 am on Wednesday (3 minutes later), the evaluation occurs at midnight on Thursday. The high bid is used directly as the price to be paid. For example, if there are two bids, 1 and 9, the winner pays 9 (as opposed to the Dutch style, where the winner would pay 2). Users may modify their bids up to the moment the auction closes. Bids with the same price are awarded to the player whose first bid was received earliest.

In one example, in a user interface for placing bids, once a player is found, e.g., by a search or a notification alert, the user is provided with an input interface for entering a bid amount for the player. The user is informed of the user's current currency balance, and the estimated time at which the transaction will take effect if the user wins.

If the user has another outstanding bid, the user's available balance of currency units is displayed as if the other bid(s) are successful. That is, the currency units bid in the other bids are subtracted from the user's balance for purposes of displaying the available number of currency units. If the transaction will create a roster error (such as exceeding a roster cap), another section or page will be displayed, asking the user to select a player to be dropped. The user may be informed of balance ramifications of dropping a player, e.g., no currency units will be credited to the user's balance for that player. If the user attempts to exceed the negative balance limit, the user is notified of the error, and the transaction does not complete. If the user is at the negative balance limit, the user may not bid on a player, and an error message is displayed. The user may able to modify or cancel a bid before the auction has taken place. If the player has a bid from another user, the transaction end time is the end time set upon entry of the initial bid.

Upon completion of the bid, a successful bid notification is displayed. The initial successful bid determines the end of auction time. If the original bidder modifies the original bid, the transaction time remains unchanged. Similarly, if the original bidder deletes their bid after a second user has bid on the same player, the transaction time remains unchanged. Soon after successful completion of the bid, a pending transactions display is updated with the bidding user's team name, the player name, and the ending transaction time (i.e., sufficient information that another user can bid on the same player before the auction is over). If a bid is canceled, the transaction is removed from the pending transactions display.

In one aspect, at a defined time after the bid completes, e.g., 30 minutes post bid completion, the users of the league are notified of the bid via their contact settings (email, SMS, etc.). If the player becomes unavailable (e.g., is dropped from the real-life team, moves to another league, or the like) between the initial bid and the auction transaction time, all bids for that player are canceled, the bidding users are notified (using contact settings), the transaction is removed from the pending state, and the users bids are made public. Any currency units bid are made available for other transactions.

Block 204 selects the highest bid, i.e., the bid having the maximum price. The user who places the highest bid is the winner of the auction. After the winner of the auction is chosen, block 206 adds the player to the winning user's roster, the player appears on the bench of the winning user's team, and block 208 deducts the bid currency units from the currency balance of the winning user. In this example, the bid currency units are not awarded to any other user. The bids are then moved from the pending transactions display to a final transactions display. The bids and the player's disposition are made public. For instance, instead of "Miles bid for Roberto" the completed section will read 'Miles unsuccessfully bid 6 pts for Roberto; Dave successfully bid 7 currency units for Roberto.' If the bid caused the user to exceed the roster cap, then the player that was indicated to be dropped is moved to the free agent list. No currency units are returned to the user for that transaction. In one embodiment, there is a limit to the number of players that a user can acquire to prevent abuse.

The users in the league, except for the bidders, are notified by, e.g., the user contact settings about the transaction, the winner is notified of the successful transaction, and the losers are notified of their unsuccessful transaction. The unsuccessful bidders may now use their currency units in subsequent other bids or transactions.

Figure 3:
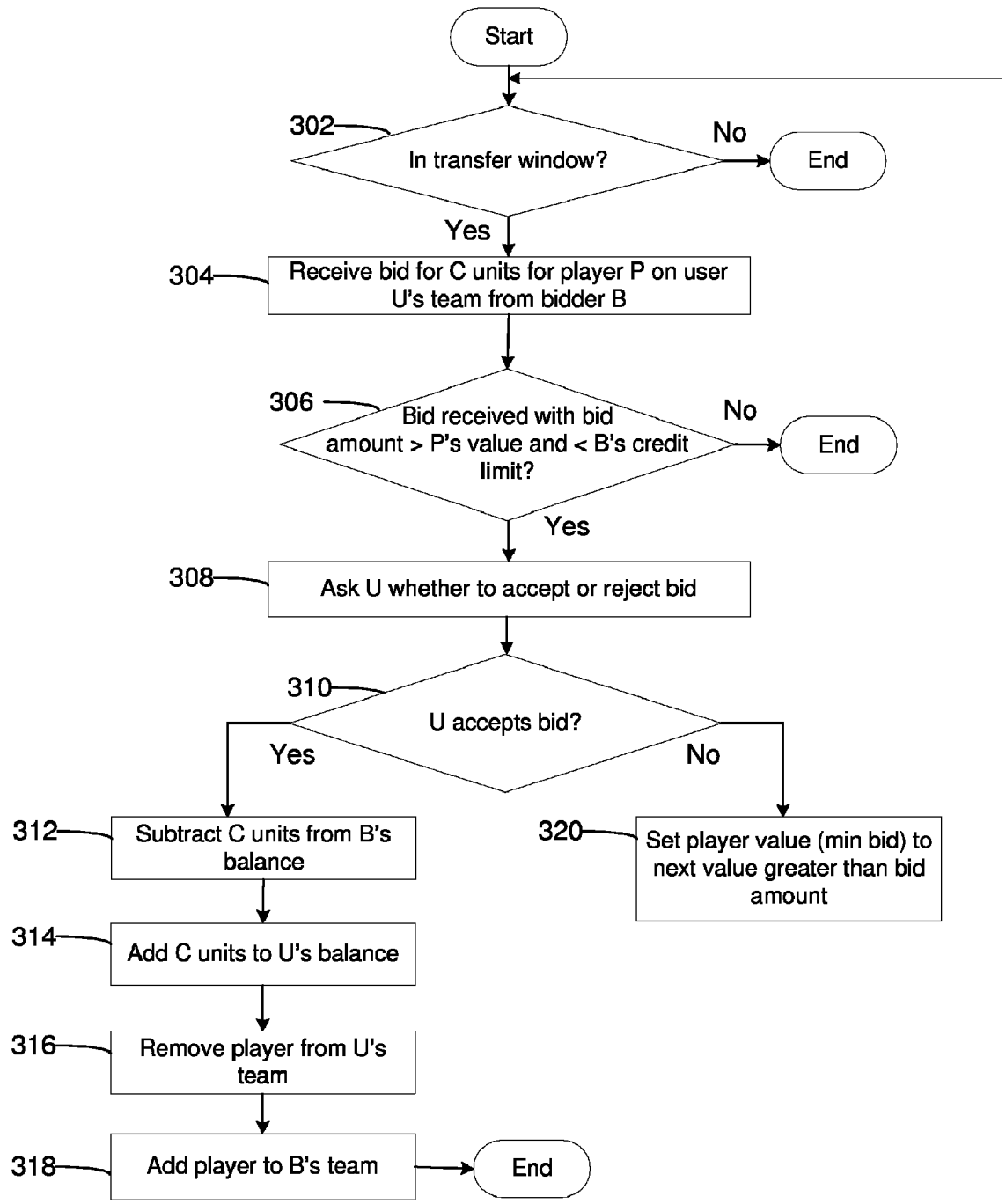
FIG. 3 illustrates a process of transferring fantasy sports players in accordance with embodiments of the invention.

FIG. 3 illustrates a process of transferring fantasy sports players between users in accordance with embodiments of the invention. In one example, transfers are similar to auctions of players, except that in transfers, every player is for sale; furthermore, transfers can only occur during a transfer window. For example, in English Premier League (EPL) soccer games, by default, there are two transfer windows, which are the EPL dates, i.e., beginning of the season 11:59 pm UTC August 31, and midnight UTC December 31 to 11:59 pm UTC January 31). A user decides which player (currently on another user's team) the user wants, and makes a bid for the player using the user's accumulated currency units. The current owner of the player decides whether to accept (in which case the player and currency units are traded) or reject the bid (by matching the number of currency units bid). Block 308 asks the current owner of the player to accept or reject the bid. If the owner rejects the bid, block 320 sets the player's value, i.e., the minimum bid amount, to the next value greater than the bid amount. For example, if the bid amount is $20, and the owner rejects the bid, block 320 sets the bid amount to $21 (or $21.01, if fractional currency units are permitted). Block 320 then transfers control to block 302 to repeat the bidding process, giving the bidding user a chance to submit a higher bid, and giving the owner a chance to reject the higher bid. The process repeats until the owner accepts a bid, or no players place bids, or the transfer window ends.

In one example, the bid amount, i.e., the number of currency units that the user may offer, is limited to the user's balance plus the user's "credit limit", where the credit limit is a maximum number of currency units that the user is permitted to borrow. For example, Team A may buy a player named Rod Carew from Team B for 10 currency units in an auction. The owner of the player (Team B in this example), may accept the bid, or counter. After a bid is submitted, the owner is notified, and given a time period, e.g., 3 days, to counter offer to keep the player. If the owner does not make a counter offer within the time period, and the bid is accepted (implicitly or explicitly) by the owner, the player changes teams at blocks 316 and 318, and the bid amount is paid to the original team at blocks 312 and 314. That is, the bid amount is subtracted from the bidding team's balance (block 312), and added to the original team's balance (block 314). If the bid is countered, the difference between the new bid and the original price is subtracted from the original team's balance.

In this example, bids are accepted by default. Therefore, a first user will lose a player (and gain currency units) if another user bids on one of the first user's players, and the first user does nothing. In another example, bids may be rejected by default, but rejecting a bid would, under this market system, imply the user matches the bid with no action. Allowing bids to be accepted by default has abuse ramifications: if user A knows B will not respond, A may make large offers (10,000 currency units for Player A), which would result in user A losing a large number of currency units. In the "accept by default" case, the worst case is that the user loses a player, but receives currency units. Since the bid is a public auction, the auction should end at a reasonable price, i.e., if user A tries to underpay user B, user C will probably try to raise the bid so they can get the unfair price (repeating until a reasonable price is determined).

In one aspect, in contrast to free agency, transfers end some number of hours after the last bid, e.g., 72 hours after the last bid. The current owners may need more time to decide (e.g. to get back from vacation) than in an acquisition. Each successive bid on a player resets the ending time. In another example, bids may be public, so that other users know the bid amount, and thus the other users may try to raise the price. Public bids help prevent collusion, and are an instances where the user may receive currency units returned for player (another is when a player becomes inactive or leaves the league).

The transfer transaction does not necessarily result in a player being transferred. The transfer transaction runs as a normal auction (instead of sealed bid). There are more limits to transfers, e.g., abuse limits, time windows, and the like. There may be a limit to the number of times a specific player may be transferred during a season.

As described above, the current owner of a player receives a price break on keeping their owned players (as switching teams has overhead). Current owners may keep their player by offering (90%) or (10pts) less than the maximum bid. Transfers have a larger minimum raise than acquisitions. In acquisition, bids can be made in small increments. In transfers users may try to adjust each player's price to a market value.

If the player being bid upon becomes inactive (e.g., leaves the league, is cut from a team, or the like) during the auction, the auction is canceled, the current owner is given the initial draft allocation currency units (as if another team bought the player for that amount), and the player is removed from the user's roster.

In one example, transfers are performed as follows. A user finds a player on which to bid, through, for example, another team's roster page, a player search, research tool, pending transactions, or the like. The transfer flag option may not be available when the league is outside its transfer windows, or after a player has been transferred the maximum (e.g., 2) number of times. Block 302 ensures that bids are processed during transfer windows.

After a bidding user selects a player on which to bid, a user interface is presented in which the user may enter a bid for the player. The bidding user is informed of his/her current balance of available currency units; currently open bids for the player; and the time at which the transaction will take effect (if no further bids are placed). If the user has another outstanding bid, the calculation of the user's available balance assumes the other bid(s) are successful, and those currency units are subtracted from the available balance for the purpose of the calculation. Block 304 receives a bid from bidder B of C currency units for a player P on user U's team.

Block 306 ensures that the transaction is valid, e.g., by ensuring that the bid amount C is greater than the player P's value and less than the bidder B's balance plus any available credit. If not, the process terminates and the bid is unsuccessful. That is, if the user attempts to spend more currency than the user's credit limit, the user should be notified about the error, and the transaction will not complete, unless the user currently owns the player. In another aspect, if the transaction will create a roster error (e.g., exceeding the roster cap), the user interface will display another section or page asking which player will be dropped. The user should be informed of the currency balance ramifications of dropping the player, e.g., no currency units will be credited. If the user's current balance is at the negative balance limit, the user should not be able to bid on a player, and an error message should be displayed. There is, in one example, a "Larry Bird Salary cap" exception, in which a bid is allowed to exceed the negative cap if the user is in a competitive transfer bid situation. This exception allows a team to keep an existing player in the following example situation. In this example, owner A's currency balance is −190 units, and A owns a star player at 40 units with a negative cap at −200 units. Suppose that owner B then bids 51 units since owner A can go to at most −200, and thus cannot match B's bid. However, the Larry Bird exception may be invoked in this case, allowing A to increase the bid.

In one aspect, the transfer auction ends 72 hours after the last successful bid. Upon completion of the bid, a success notification is displayed. The user and current owner may also be contacted (e.g., email, SMS or the like, according to contact settings). The bids are shown in the pending transaction section of the game user interface as, for example, team name, bid amount, player, current team, and auction end time.

In one example, the initial bid may be more or less than the bidding user's initial currency allocation. If the current owner wins the bid for less than the initial allocation, the difference between the initial allocation and the bid price are given to the current owner. No team loses currency units in this example. If the current owner wins the bid for more than the draft allocation, the difference is taken from the owner, and no team gains currency units. If the current owner wins the bid for the same number of currency units, no change is made. If another user wins the bid, the winner loses the number of currency units bid, and gains the player and the owner loses the player, and gains the number of currency units bid.

In one example, for player transfers, the current owner may not initiate an auction for a player he or she owns. Further, a user may not initiate an auction for more than a certain number (e.g., 3) of players from any one team during a transfer window, regardless of whether the user wins the player. A user may not initiate more than a certain number (e.g., 7) transfers during a season. A user may not participate in more than a certain number (e.g., 4) transfer auctions at any one time. If a user reaches this limit, the user may be informed that they must cancel a bid before beginning another auction. Auctions may close past the closing of the transfer window, but are initiated before its close.

If the player becomes unavailable, e.g., is cut from a team, moves to another league, or the like, between the time of the initial bid and the time of the auction transaction, then all bids for that player are canceled, and the users that bid are notified (using contact settings). The transaction is then removed from the pending state. Any currency units bid are made available for other transactions. Otherwise, if the player remains available, after the winner is chosen, the player appears on the bench of the winning user's team, the bid currency units are deducted from the winning user and awarded to the previous owner. In the user interface, the bids are moved from the pending transactions user interface module to a final transactions user interface module. If the bid places the user over the roster cap, the player to be dropped is moved to the free agent list, and no currency units are returned to the user for that transaction.

In one example, the users in the league (except for the bidders) are notified via the user contact settings about the transaction. The winner is notified of the successful transaction. The losers are notified of their unsuccessful transaction. The unsuccessful bidders may now use the currency units for other bids or transactions. Note that in future seasons, the transfer window may open before the draft is held (for so-called "keeper" leagues that allow players to be kept after the end of a season and used in the next season).

In one example, an expense manager allows a league to convert the game's currency units to different currencies. The following information is tracked: Number of currency units used in draft, number of units used in transfers, number of transfers bought, number of units used in free agents, number of free agents acquired, number of units returned in transfers, number of players lost in transfers.

Figure 4:
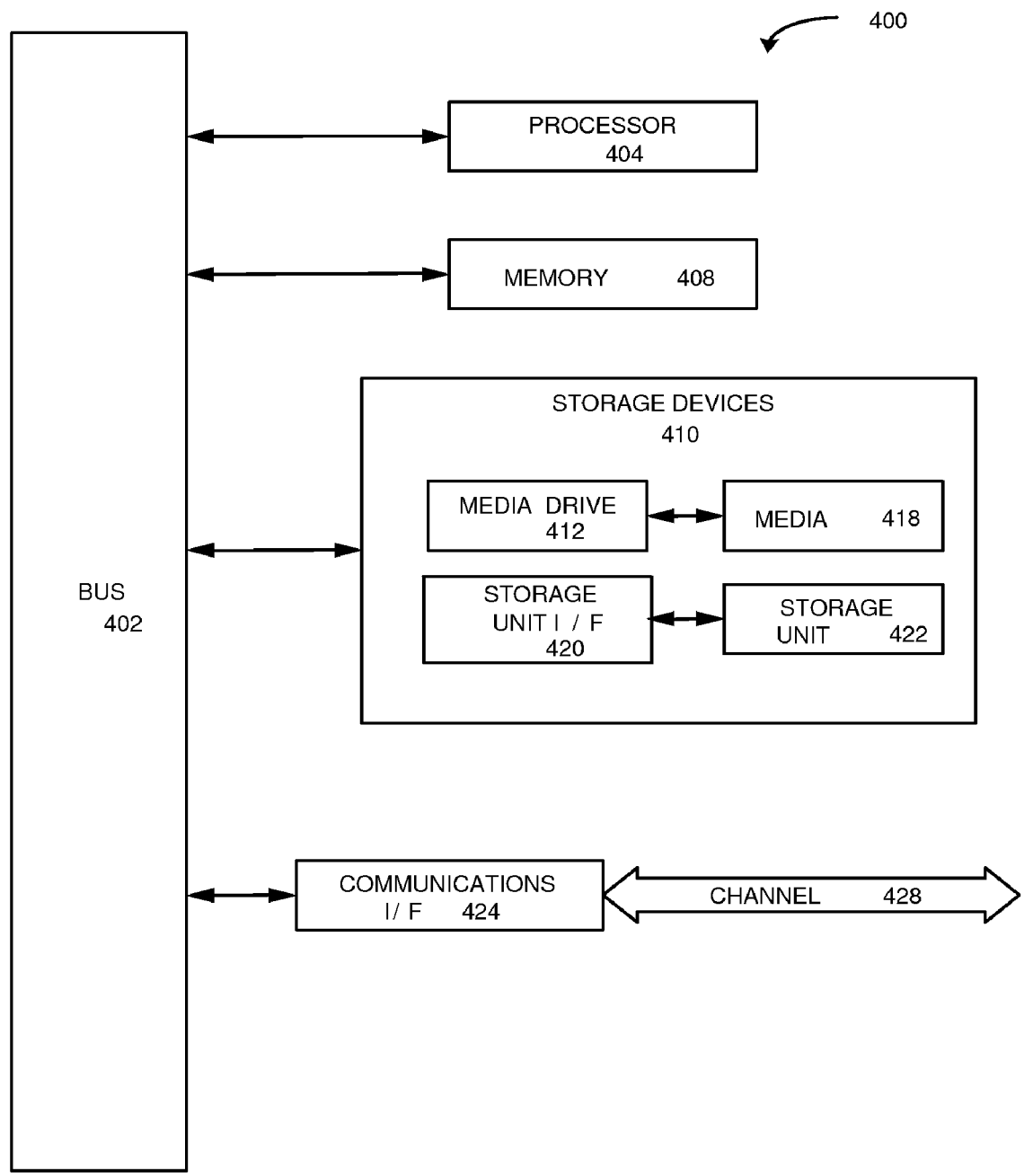
FIG. 4 illustrates a typical computing system that may be employed to implement processing functionality in embodiments of the invention.

FIG. 4 illustrates a typical computing system 400 that may be employed to implement processing functionality in embodiments of the invention. Computing systems of this type may be used in clients and servers, for example. Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special purpose processing engine such as, for example, a microprocessor, microcontroller or other control logic. In this example, processor 404 is connected to a bus 402 or other communication medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory ("ROM") or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 418, may include, for example, a hard disk, floppy disk, magnetic tape, optical disk, CD or DVD, or other fixed or removable medium that is read by and written to by media drive 414. As these examples illustrate, the storage media 418 may include a computer-readable storage medium having stored therein particular computer software or data.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a USB port), a PCMCIA slot and card, etc. Software and data transferred via communications interface 424 are in the form of signals which can be electronic, electromagnetic, optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 408, storage device 418, or storage unit 422. These and other forms of computer-readable media may be involved in storing one or more instructions for use by processor 404, to cause the processor to perform specified operations. Such instructions, generally referred to as "computer program code" (which may be grouped in the form of computer programs or other groupings), when executed, enable the computing system 400 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 414, drive 412 or communications interface 424. The control logic (in this example, software instructions or computer program code), when executed by the processor 404, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus comprising:
a processor;
a storage medium configured to tangibly store thereon program logic for execution by the processor, the program logic comprising:
currency balance association logic configured to associate a currency balance with a first user of a fantasy sports game;
currency balance adjustment logic configured to:
adjust the currency balance by a first quantity in response to a sports player action that occurs in a real life sports game, wherein the first quantity is based upon the sports player action, and
adjust the currency balance by a second quantity in response to transfer of a sports player to or from a fantasy sports team in the fantasy sports game and associated with the first user, wherein the second quantity is based upon a value of the sports player; and
price enforcement logic configured to prevent transfer of the sports player to the fantasy sports team in response to the second quantity being greater than the currency balance.

2. The apparatus of claim 1, wherein the currency balance adjustment logic is further configured to increase the currency balance by the first quantity in response to the sports player action.

3. The apparatus of claim 1, wherein the sports player action comprises a game play action that is associated with a currency value, and the first quantity is based upon the currency value.

4. The apparatus of claim 1, wherein the sports player action comprises scoring a number of game points, and the first quantity is based upon the number of game points.

5. The apparatus of claim 1, wherein the currency balance adjustment logic is further configured to decrease the currency balance by the second quantity in response to acquisition of the sports player by the fantasy sports team.

6. The apparatus of claim 1, wherein the currency balance adjustment logic is further configured to increase a currency balance of a second user by the second quantity in response to acquisition of the sports player by a fantasy sports team associated with the second user,
wherein the sports player is transferred from the team associated with the second user to the team associated with the first user, and the second quantity is based upon the value of the sports player.

7. The apparatus of claim 1, wherein the transfer of the sports player comprises a player draft, a player trade, an acquisition of an unclaimed player, a transfer of a sports player between two fantasy sports teams, or a combination thereof.

8. The apparatus of claim 1, wherein the transfer occurs in an auction or as a result of a user-to-user offer.

9. The apparatus of claim 1, wherein the value of the sports player is based upon performance of the sports player in the real life sports game.

10. The apparatus of claim 1, wherein the value of the sports player is based upon a depreciation formula.

11. The apparatus of claim 1, wherein the value of the sports player is determined based upon a negotiation between the first user and a second user, an auction, or a combination thereof.

12. The apparatus of claim 1, wherein the currency balance comprises a number of points, a number of units of currency, or a combination thereof.

13. A non-transitory computer readable storage medium for tangibly storing computer instructions for execution by a processor, the instructions comprising:
associating a currency balance with a first user of a fantasy sports game;
adjusting the currency balance by a first quantity in response to a sports player action that occurs in a real life sports game, wherein the first quantity is based upon the sports player action;
adjusting the currency balance by a second quantity in response to transfer of a sports player to or from a fantasy sports team in the fantasy sports game and associated with the first user, wherein the second quantity is based upon a value of the sports player; and
preventing transfer of the sports player to the fantasy sports team in response to the second quantity being greater than the currency balance.

14. The non-transitory computer readable storage medium of claim 13, wherein the instructions for adjusting the currency balance by a first quantity further comprises instructions for increasing the currency balance by the first quantity in response to the sports player action.

15. The non-transitory computer readable storage medium of claim 13, wherein the sports player action comprises a game play action that is associated with a currency value, and the first quantity is based upon the currency value.

16. The non-transitory computer readable storage medium of claim 13, wherein the sports player action comprises scoring a number of game points, and the first quantity is based upon the number of game points.

17. The non-transitory computer readable storage medium of claim 13, wherein the instructions for adjusting the currency balance by a second quantity further comprises instructions for decreasing the currency balance by the second quantity in response to acquisition of the sports player by the fantasy sports team.

18. The non-transitory computer readable storage medium of claim 13, further comprising instructions for:
increasing a currency balance of a second user by the second quantity in response to acquisition of the sports player by a fantasy sports team associated with the second user,
wherein the sports player is transferred from the team associated with the second user to the team associated with the first user, and
the second quantity is based upon the value of the sports player.

19. The non-transitory computer readable storage medium of claim 13, wherein the transfer of the sports player comprises a player draft, a player trade, an acquisition of an unclaimed player, a transfer of a sports player between two fantasy sports teams, or a combination thereof.

20. The non-transitory computer readable storage medium of claim 13, wherein the transfer occurs in an auction or as a result of a user-to-user offer.

21. The non-transitory computer readable storage medium of claim 13, wherein the value of the sports player is based upon performance of the sports player in the real life sports game.

22. The non-transitory computer readable storage medium of claim 13, wherein the value of the sports player is based upon a depreciation formula.

23. The non-transitory computer readable storage medium of claim 13, wherein the value of the sports player is determined based upon a negotiation between the first user and a second user, an auction, or a combination thereof.

24. The non-transitory computer readable storage medium of claim 13, wherein the currency balance comprises a number of points, a number of units of currency, or a combination thereof.

25. A method comprising:
associating, by a computer, a currency balance with a first user of a fantasy sports game;
adjusting, by the computer, the currency balance by a first quantity in response to a sports player action that occurs in a real life sports game, wherein the first quantity is based upon the sports player action;
adjusting, by the computer, the currency balance by a second quantity in response to transfer of a sports player to or from a fantasy sports team in the fantasy sports game and associated with the first user, wherein the second quantity is based upon a value of the sports player; and
preventing, by the computer, transfer of the sports player to the fantasy sports team in response to the second quantity being greater than the currency balance.

26. The method of claim 25, wherein the adjusting of the currency balance by a first quantity further comprises increasing the currency balance by the first quantity in response to the sports player action.

27. The method of claim 25, wherein the sports player action comprises a game play action that is associated with a currency value, and the first quantity is based upon the currency value.

28. The method of claim 25, wherein the sports player action comprises scoring a number of game points, and the first quantity is based upon the number of game points.

29. The method of claim 25, wherein the adjusting of the currency balance by a second quantity further comprises decreasing the currency balance by the second quantity in response to acquisition of the sports player by the fantasy sports team.

30. The method of claim 25, further comprising:
increasing a currency balance of a second user by the second quantity in response to acquisition of the sports player by a fantasy sports team associated with the second user,
wherein the sports player is transferred from the team associated with the second user to the team associated with the first user, and
the second quantity is based upon the value of the sports player.

31. The method of claim 25, wherein the transfer of the sports player comprises a player draft, a player trade, an acquisition of an unclaimed player, a transfer of a sports player between two fantasy sports teams, or a combination thereof.

32. The method of claim 25, wherein the transfer occurs in an auction or as a result of a user-to-user offer.

33. The method of claim 25, wherein the value of the sports player is based upon performance of the sports player in the real life sports game.

34. The method of claim 25, wherein the value of the sports player is based upon a depreciation formula.

35. The method of claim 25, wherein the value of the sports player is determined based upon a negotiation between the first user and a second user, an auction, or a combination thereof.

36. The method of claim 25, wherein the currency balance comprises a number of points, a number of units of currency, or a combination thereof.

* * * * *